United States Patent
Harrison et al.

(10) Patent No.: US 11,502,772 B2
(45) Date of Patent: Nov. 15, 2022

(54) SIGNAL GENERATOR

(71) Applicant: Kirintec Limited, Ross on Wye (GB)

(72) Inventors: Richard Harrison, Ross on Wye (GB); Paul Hill, Ross on Wye (GB)

(73) Assignee: KIRINTEC LIMITED, Herefordshire (GB)

( * ) Notice: Subject to any disclaimer, the term of this patent is extended or adjusted under 35 U.S.C. 154(b) by 0 days.

(21) Appl. No.: 16/934,212

(22) Filed: Jul. 21, 2020

(65) Prior Publication Data
US 2021/0021368 A1 Jan. 21, 2021

(30) Foreign Application Priority Data

Jul. 19, 2019 (GB) .................................... 1910376

(51) Int. Cl.
*H04K 3/00* (2006.01)
*H04L 7/00* (2006.01)
*H04L 25/03* (2006.01)

(52) U.S. Cl.
CPC ............. *H04K 3/65* (2013.01); *H04L 7/0008* (2013.01); *H04L 7/0016* (2013.01); *H04L 25/03006* (2013.01); *H04L 2025/03783* (2013.01)

(58) Field of Classification Search
CPC ........ H04K 3/65; H04K 2203/34; H04K 3/28; H04K 3/45; H04K 3/00; H04K 3/40; H04K 3/41; H04L 7/0008; H04L 7/0016; H04L 25/03006; H04L 2025/03783
USPC ........................................................... 455/1
See application file for complete search history.

(56) References Cited

U.S. PATENT DOCUMENTS

| 4,342,119 A | 7/1982 | Seidl | |
|---|---|---|---|
| 10,834,754 B2 * | 11/2020 | Merlin | ................... H04W 84/12 |
| 2006/0164283 A1 * | 7/2006 | Karlsson | ................... H04K 3/42 |
| | | | 342/14 |
| 2009/0009379 A1 * | 1/2009 | Olsson | ..................... H04K 3/44 |
| | | | 342/14 |

(Continued)

FOREIGN PATENT DOCUMENTS

| CN | 104753625 A | 7/2015 |
|---|---|---|
| DE | 102011101712 A1 | 10/2011 |

(Continued)

*Primary Examiner* — Don N Vo
(74) *Attorney, Agent, or Firm* — DeLio Peterson & Curcio LLC; Brian G. Schlosser

(57) ABSTRACT

Disclosed is a method of producing an output signal from a signal generator, comprising: determining a driving input to the signal generator, the driving input for driving the signal generator to provide a predetermined output signal, wherein the output signal includes at least one frame, the at least one frame comprising an active period and a dummy period and wherein the active period and dummy period are determined by the driving input. Also disclosed is a method of producing an output signal from a signal generator, comprising: receiving a synchronisation signal; obtaining an input signal for controlling the signal generator to generate an output signal comprising at least one frame wherein the at least one frame comprises at least one active period and at least one dummy period; producing the output signal comprising a series of frames; and, synchronising the output signal with the synchronisation signal by varying a duration of the at least one of the dummy period or active period.

15 Claims, 7 Drawing Sheets

(56) References Cited

U.S. PATENT DOCUMENTS

| | | |
|---|---|---|
| 2009/0061759 A1 | 3/2009 | Stoddard et al. |
| 2009/0097531 A1* | 4/2009 | Franceschini .......... H04K 3/255 375/133 |
| 2009/0237289 A1 | 9/2009 | Stoddard |
| 2010/0302087 A1 | 12/2010 | Low |
| 2015/0256286 A1* | 9/2015 | Johnson ................... H04K 3/44 455/1 |
| 2019/0082474 A1* | 3/2019 | Jung ................ H04W 74/0808 |

FOREIGN PATENT DOCUMENTS

| | | |
|---|---|---|
| EP | 1303069 A1 | 4/2003 |
| EP | 2525519 A1 | 11/2012 |
| EP | 2787650 A1 | 10/2014 |
| WO | 2007081625 A2 | 7/2007 |
| WO | 2014095651 A1 | 6/2014 |

\* cited by examiner

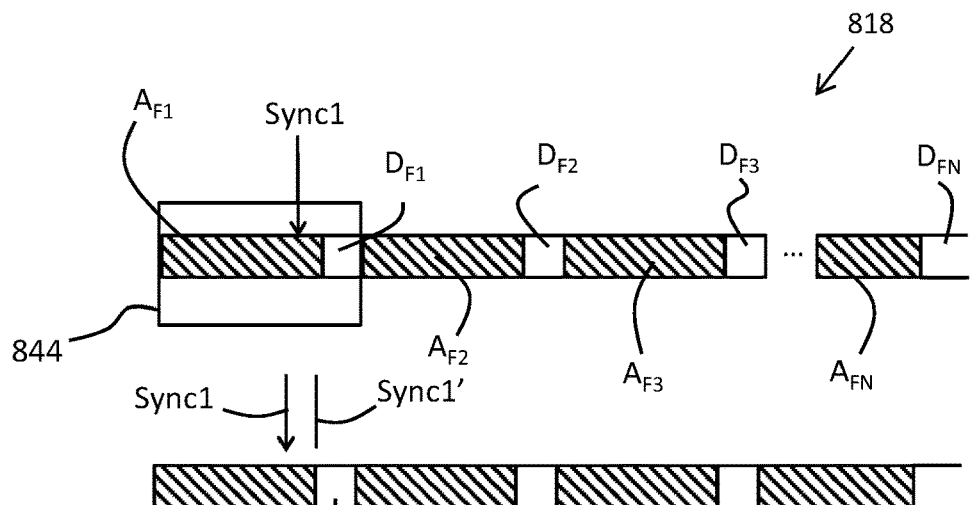
Fig. 8a
Fig. 8b
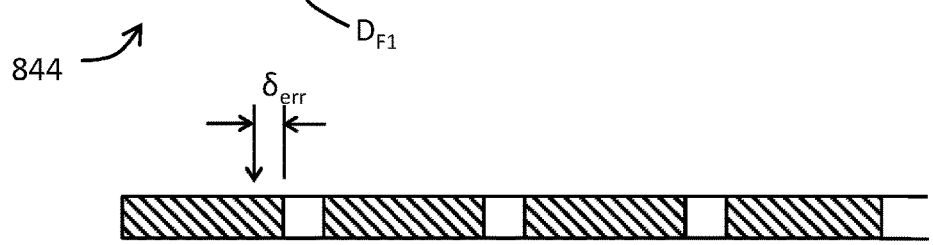
Fig. 8c
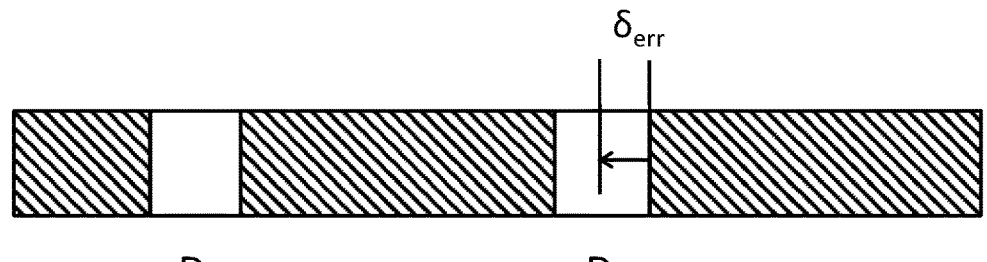
Fig. 8d
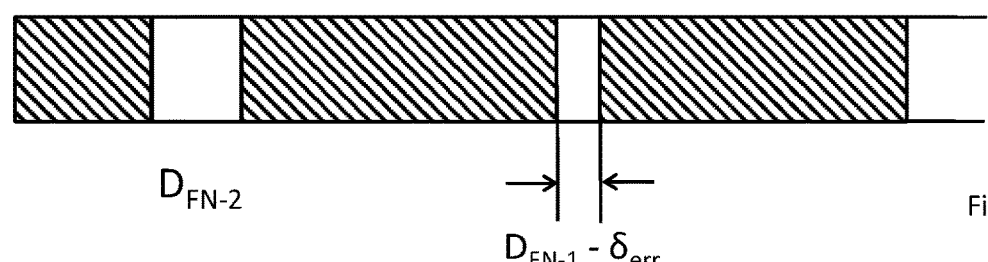
Fig. 8e
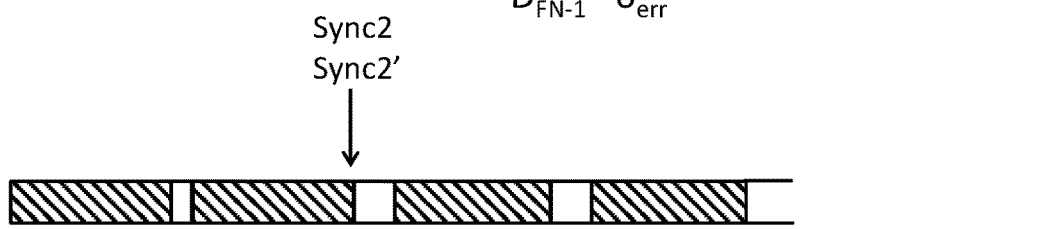
Fig. 8f

SIGNAL GENERATOR

FIELD OF INVENTION

This invention relates to a signal generator which is required to be synchronised with one or more other signal generators and/or radio wave receivers.

BACKGROUND OF THE INVENTION

A signal generator may generally be considered to a device which generates electronic signals and waveforms for various purposes and is well known in the art. Signal generators come in many different forms and can create repeating and non-repeating waveforms. Some signal generators may be referred to as a function generator which may be employed to generate more complex waveforms over a wide variety of wavelengths. Signal generators may include one or more voltage controlled oscillators, a direct digital synthesiser, DDS, or an arbitrary waveform generator, AWG. These and others which are applicable to this disclosure are well known in the art.

The applications of signal generators vary tremendously. In one example application which is pertinent to the present disclosure, signal generators may be employed in signal jammers which transmit electromagnetic radiation (i.e. radio waves) with the aim of disrupting local radio communications. In some applications, it may be necessary for signal jammers to operate in close proximity such that the signals issued from one jammer may interfere with the operation of another.

The present invention seeks to provide an improved signal generator and method of operation.

SUMMARY OF THE INVENTION

The present invention provides an apparatus and method according to the appended claims.

The present disclosure provides a method of producing an output signal from a signal generator, comprising: determining a driving input to the signal generator, the driving input for driving the signal generator to provide a predetermined output signal, wherein the output signal includes at least one frame, the at least one frame comprising an active period and a dummy period and wherein the active period and dummy period are determined by the driving input.

Providing an output from a signal generator with an active period and a dummy signal allows the signal timing to be adjusted so as to be synchronised with a synchronisation signal. In prior art systems, particularly signal jammers, the output signal from a signal generator is not synchronised with a synchronisation signal. In such systems, a mute period which is associated with the synchronisation signal is simply overlaid on the output from the signal generator causing the output signal to be either disrupted and/or regenerated.

The method may further comprise adjusting a duration of one or more of the active period and the dummy period to synchronise the output signal with a synchronisation signal.

The method may further comprise: selecting a synchronisation point in the output signal; selecting a synchronisation point in the synchronisation signal; and, determining an offset error which relates to the difference between the two synchronisation points, wherein adjusting the duration of one or more active and dummy period reduces the offset error.

The dummy period may comprise a muted output in which no output signal is generated by the signal generator.

The dummy period may include one or more dummy signals for transmission.

The one or more dummy signals may be received from or shared with at least one other signal generator apparatus and/or receiver.

The driving input may be determined by a driving circuit within the signal generator.

Further disclosed is a method according to a second aspect. The method according to the second aspect produce an output signal from a signal generator and comprises: receiving a synchronisation signal; obtaining an input signal for controlling the signal generator to generate an output signal comprising at least one frame wherein the at least one frame comprises at least one active period and at least one dummy period; producing the output signal comprising a series of frames; and, synchronising the output signal with the synchronisation signal by varying a duration of the at least one of the dummy period or active period.

The synchronisation signal may be received from an external source. The synchronisation signal may be used to synchronise the output signal with at least one other signal generator. The synchronisation signal may be a GPS signal.

The method may further comprise outputting the output signal from the signal generator. The outputting of the output signal may be carried out after a synchronisation period.

The active period or dummy period may include a time-varying waveform. The dummy period may be a muted period so that no output signal is produced.

Varying the duration of the dummy period or active period may comprise: determining a first synchronisation point of a timing reference and obtaining a second synchronisation point of the output signal; determining a difference between the first synchronisation point and the second synchronisation point; and, reducing or increasing the duration of the dummy period or active period in accordance with the difference.

The synchronisation signal may comprise a plurality of time separated pulses. The synchronisation signal may be a one pulse per second signal.

The duration of a plurality of the dummy periods or active periods may be varied. The difference between the two synchronisation points may be shared between a plurality of dummy periods or active periods. The plurality of dummy periods may be located in two to more frames.

The synchronisation between the output signal and the synchronisation signal may continue for the duration of the output signal being outputted from the signal generator.

The output signal may be provided to an antenna.

The signal generator may comprise one or more of a voltage controlled oscillator, a direct digital synthesiser, DDS, or an arbitrary waveform generator, AWG.

The signal generator may comprise a field programmable gate array, microprocessor or digital signal processor.

The method of the first two aspects identified above may be used as part of generating and outputting a jamming signal. The method may be carried out by a signal jammer and used in a system comprising a plurality of signal jammers. The signal jammers may each include a receiver. The signal generator may be synchronised with a receiver of a signal jammer such that the output of a first signal jammer may be synchronised with the receiver of a second signal jammer. As such, the second signal jammer may be configured to account for the output of the first signal jammer. Both of the first and second signal jammers may be configured to carry out the methods of the first and second aspects described above.

The dummy period may include a signal. The dummy period signal may be shared with a plurality of signal jammers.

Disclosed herein is an apparatus for producing an output signal comprising: a signal generator configured to carry out the method of any aspect or example disclosed herein; an input for receiving a driving input for driving the signal generator so as to produce a required output signal; and, a synchronisation signal input for receiving a synchronised signal.

The signal generator may be configured to receive the driving input to provide a predetermined output signal, wherein the output signal includes at least one frame, the at least one frame comprising an active period and a dummy period and wherein the active period and dummy period are determined by the driving input.

The apparatus may comprise a computing processor, or, a field programmable gate array (FPGA) configured to undertake any method steps described herein. The apparatus may comprise a computer-readable medium configured to store instructions enabling a computing processor to undertake any method steps described herein. The memory may be non-transitory.

A signal jamming system may comprise a plurality of apparatuses as disclosed herein. The signal jamming system may be configured to provide a dummy period which is the same for each signal jamming apparatus.

In another aspect, disclosed herein is an apparatus comprising: a signal generator; a driving circuit for generating a driving signal for driving the signal generator to provide a predetermined output signal, wherein the driving circuit is configured to provide a driving input signal which generates an output signal comprising at least one frame, the at least one frame comprising an active period and a dummy period and wherein the duration of the active period and dummy period are determined by the driving input.

The driving circuit may be configured to adjust a duration of one or more of the active period and the dummy period to synchronise the output signal with a synchronisation signal. The driving circuit may be further configured to: select a synchronisation point in the output signal; select a synchronisation point in the synchronisation signal; and, determine an offset error which relates to the difference between the two synchronisation points, wherein adjusting the duration of one or more active and dummy period reduces the offset error.

The driving circuit may be configured to provide the dummy period comprising a muted output in which no output signal is generated by the signal generator.

The driving circuit may be configured to provide the dummy period comprising one or more dummy signals for transmission.

The apparatus may further comprise an input for receiving a driving input signal, wherein the driving input signal includes data relating to one or more dummy signals which is shared with at least one other signal generator apparatus and/or receiver apparatus.

According to a yet further aspect is an apparatus for producing an output signal, comprising: a signal generator configured to generate an output signal comprising at least one frame wherein the at least one frame comprises at least one active period and at least one dummy period using a driving input signal wherein the output signal comprising a series of frames; a synchronisation input for receiving a synchronisation signal; and, wherein the apparatus is configured to synchronise the output signal with the synchronisation signal by varying a duration of the at least one of the dummy period or active period.

The synchronisation signal may be received from an external source.

The synchronisation signal may be used to synchronise the output signal with at least one other signal generator and/or receiver of a second apparatus.

The apparatus may further comprise an output switch configured to switch the output of the signal generator between an on state and an off state and a controller for controlling the switch to be an off state during synchronisation and on thereafter so that the outputting of the output signal is carried out after a synchronisation period.

The controller may be configured to control the switch such that the output switch is off during a muted period so that no output signal is produced.

The apparatus may further comprise a driving circuit for generating the driving input signal. The driving circuit may be configured to vary the duration of the dummy period or active period by: determining a first synchronisation point of a timing reference and obtaining a second synchronisation point of the output signal; determining a difference between the first synchronisation point and the second synchronisation point; and, reducing or increasing the duration of the dummy period or active period in accordance with the difference.

The driving circuit may be configured to vary the duration of a plurality of the dummy periods or active periods.

The driving circuit may be configured to share the difference between the two synchronisation points between a plurality of dummy periods or active periods.

The apparatus may further comprise an antenna and the output signal is provided to an antenna.

The signal generator may comprise one or more of a voltage controlled oscillator, a direct digital synthesiser, DDS, or an arbitrary waveform generator, AWG.

The signal generator may comprise a field programmable gate array, microprocessor or digital signal processor.

The skilled person will appreciate that except where mutually exclusive, a feature described in relation to any one of the aspects, examples or embodiments described herein may be applied to any other aspect, example, embodiment or feature. Further, the description of any aspect, example or feature may form part of or the entirety of an embodiment of the invention as defined by the claims. Any of the examples described herein may be an example which embodies the invention defined by the claims and thus an embodiment of the invention.

BRIEF DESCRIPTION OF THE DRAWINGS

The invention will now be described, by way of example only, with reference to the accompanying drawings, in which:

FIGS. 8a to 8f show a series of steps which may be taken to synchronise the output of a signal generator with a synchronisation signal;

DETAILED DESCRIPTION

Figure 1:
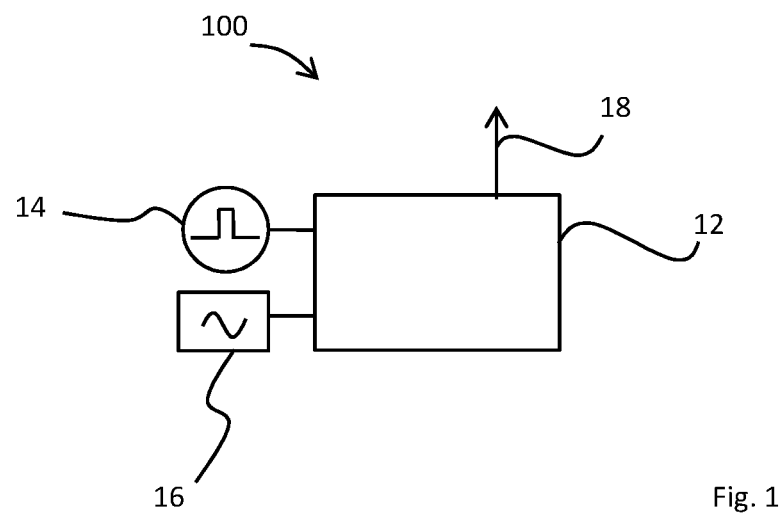
FIG. 1 shows a schematic representation of an apparatus according to the present disclosure.

FIG. 1 shows a schematic representation of an apparatus 100 which may embody the invention of the present disclosure. The apparatus 100 (which may be referred to as a unit or entity within this disclosure) includes a signal generator 12 which receives a synchronisation signal 14 and an input 16 which is converted by the signal generator 12 into a generated waveform which is outputted for use. The use of the output 18 can vary and is not limited expect by the suitability of the application.

In the example shown, the output 18 may be connected to an antenna (not shown) so as to emit electromagnetic waves according to the output of the signal generator 12. In the examples provided in this disclosure the signal generator 12 may form part of an electromagnetic jamming device which is used for transmitting electromagnetic waves, i.e. radio waves, for the purpose of disrupting local electromagnetic communications. However, other examples may employ the methods and apparatuses described herein.

The synchronisation signal 14 may be generated internally, that is, within the apparatus housing (not shown), or externally and received via a suitable input and interface. The synchronisation signal 14 may be received wirelessly or via a wired connection. The connection may form part of a network which may be a communication system, a positioning system, wide area network or local area network, for example. In some examples, the synchronisation signal 14 may be incorporated with another signal. Thus, the synchronisation signal 14 may be received by a different apparatus before being sent to the apparatus 100. For the purpose of this disclosure, the synchronisation signal 14 may be considered to be received by the apparatus 100 when received indirectly or directly.

The apparatus 100 may be one of a plurality of apparatuses which are required to be synchronised in use. Such a plurality of apparatuses may be referred to as a network. When the network of apparatuses is employed to emit radio waves (as per a signal jammer for example), members of the network may be further defined by being within range of each other such that a receiver associated with the apparatus 100 (not shown) can receive the output of another apparatus in the network. In some examples, the network of apparatuses may be referred to as a network of signal generators.

The synchronisation signal 14 may be used by the apparatus 100 and/or a signal generator of the apparatus to adjust the timing of the output 18 of the signal generator 12. In doing so, the output 18 of the signal generator 12 may be coordinated with other signal generators which receive the same (or a related and/or corresponding) synchronisation signal 14. Thus, in the case of a jamming device, the signals issued from jammers within range of each other may be coordinated so as to output signals which are temporally aligned with one another. This is not to suggest that the signal generator outputs are the same, only that the outputs can be temporally aligned for periods of the outputs.

In one example, there may be a requirement for each of the outputs 18 of a plurality of signal generators 12 to have signals which do not interfere with each other. Hence, there may be periods or frames of respective outputs 18 which are muted so that no output 18 is provided. In other examples, it may be a requirement that periods or frames of the output 18 are known and recognisable by the other signal generators 12 within the plurality of signal generators 12 such that they can be accounted for, if received. In yet another example, there may be instances where there is a requirement that at least one period or frame provides a similar or identical output 18 to the other signal generators. However, the different outputs 18 of the signal generators 12 will typically vary in at least some frames or periods.

In some examples (not related to signal jamming apparatuses) the signal generator 12 may have time-varying output power requirements in which there are frames or periods of the output 18 which are high power and some which are low power. In this case, the synchronisation of the outputs of signal generators in a network may be such that it is possible to provide a power sharing scheme in which the outputs of a plurality of signal generators are coordinated to help reduce power fluctuations in the network. Thus, in one example, periods of high power outputs of one or more first signal generators may be timed to coincide with low power outputs of one or more second signal generators, or vice versa.

The input 16 may be a driving input which will cause the signal generator 12 to provide the required output 18. In some examples, the driving input 16 may be provided by one or more components or circuits within the signal generator 12. Thus, the signal generator 12 may include a driving circuit in the form of a field programmable gate array, FPGA, or may include one or more processors which provide the output, or a digital signal processor (DSP). In other examples, the apparatus 100 and/or signal generator 12 may receive an external driving input 16 in the form of driving input data which is inputted into the signal generator 12 to cause the required output 18. The driving input data 16 may be inputted into a driving circuit.

The driving input data may be generated and/or stored within the signal generator 12 or may be received by the signal generator 12 from an external source, as depicted in FIG. 1.

The driving input signal 16 may be modified upstream of the apparatus 100 and signal generator 12, so as to be synchronised with the synchronisation signal 14 prior to being inputted to the signal generator 12.

Figure 2:
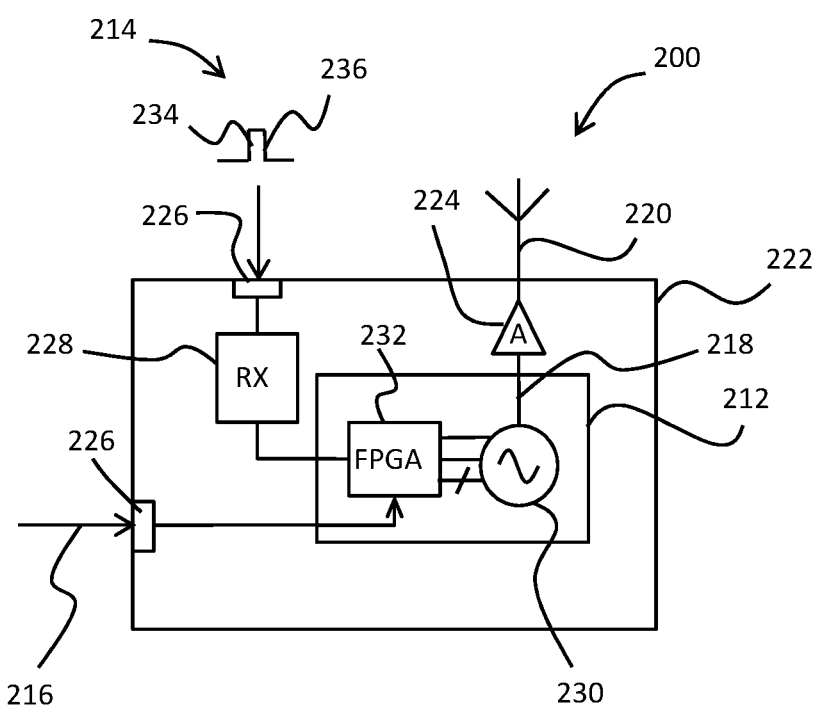
FIG. 2 shows a further schematic representation of an apparatus according to the present disclosure.

FIG. 2 shows a schematic representation of an apparatus 200 showing an example signal generator 212 in more detail. As discussed briefly above, apparatus 200 may be a jamming device. The apparatus 200 may include a signal generator 212, a synchronisation signal input 214 and an input 216 for driving the signal generator 212 to provide a predetermined output waveform. The output may be provided to an antenna 220. The components of the apparatus 200 may be collocated within a common housing 222. The apparatus 200 may additionally comprise one or more of: RF circuitry 224 for conditioning the output 218 of the signal generator 212 (for broadcast via the antenna 220 or some other purpose); interfaces 226 for receiving the driving input 216 and synchronisation signal 214; and, one or more receivers 228 for receiving the driving input 216 and synchronisation signal 214.

Receiver 228 or one or more other receivers may be used in the apparatus to receive signals which are transmitted in the vicinity of the apparatus. The receiver may be synchronised with the synchronisation signal such that signals are only received during the mute or dummy periods of nearby transmitters. In doing this way, it is possible for the receiver to be synchronised with the output signals, either muted or otherwise, so that the receiver can be used to pick up signals of significance, for example, signals that require jamming.

The signal generator 212 may be any suitable signal generator known in the art. In some examples, this may include a waveform generator in the form of a voltage controlled oscillator or a function generator 230. The function generator 230 may be a direct digital synthesiser, DDS, or an arbitrary waveform generator, AWG, for example. The signal generator 212 may also comprise a driving circuit 232 which controls the operation of the waveform generator to provide the desired output. It will be appreciated that type and configuration of the driving circuit 232 will be dependent on the type and configuration of the waveform/function generator 232.

In the example shown in FIG. 2, the function generator 230 is a DDS which may be driven by a driving circuit in the form of a field programmable gate array, FPGA. The FPGA may receive the input 216 from an external source, as shown, or may be generated within one or more circuits of the signal generator 212. In some examples, the driving circuit 232 may be provided with the input driving data from a separate part of the apparatus and/or a data module. The input driving data may be provided from a user who requires a specific signal, or calculated in response to a received signal, as known in the art.

The synchronisation signal 214 may be received from an external source, as shown in FIG. 2. The external source may be any source which can provide a signal 214 to the apparatus 200. In the case where the synchronisation is required amongst multiple apparatuses, it may be hard wired or broadcast wirelessly from a common source. In some examples, the synchronisation signal may be received from a satellite and may be part of a global positioning satellite, GPS, signal. Other examples of a synchronisation signal may include precision time protocols which may be defined by, for example, the IEEE1588 standard or a local area synchronising signal. It will be appreciated that other examples may be possible and the synchronisation signal may be globally distributed or locally generated and distributed within the network of a plurality of apparatuses.

The synchronisation signal 214 may include a periodic waveform or similar which includes one or more attributes suitable for synchronising the output 218 of the signal generators 212 in a network. In some examples, the synchronisation signal 214 may include a periodic pulse which comprises at least one rising edge 234 and/or falling edge 236. The period of the synchronisation signal 214 may be at any suitable. In some examples, the signal 214 may comprise a one pulse per second signal which provides a series of pulses with a period of one second. Each pulse may be comprises a sharp rising edge and a sharp falling edge. The one pulse per second signal may be provided as part of a GPS signal.

Figure 3A:
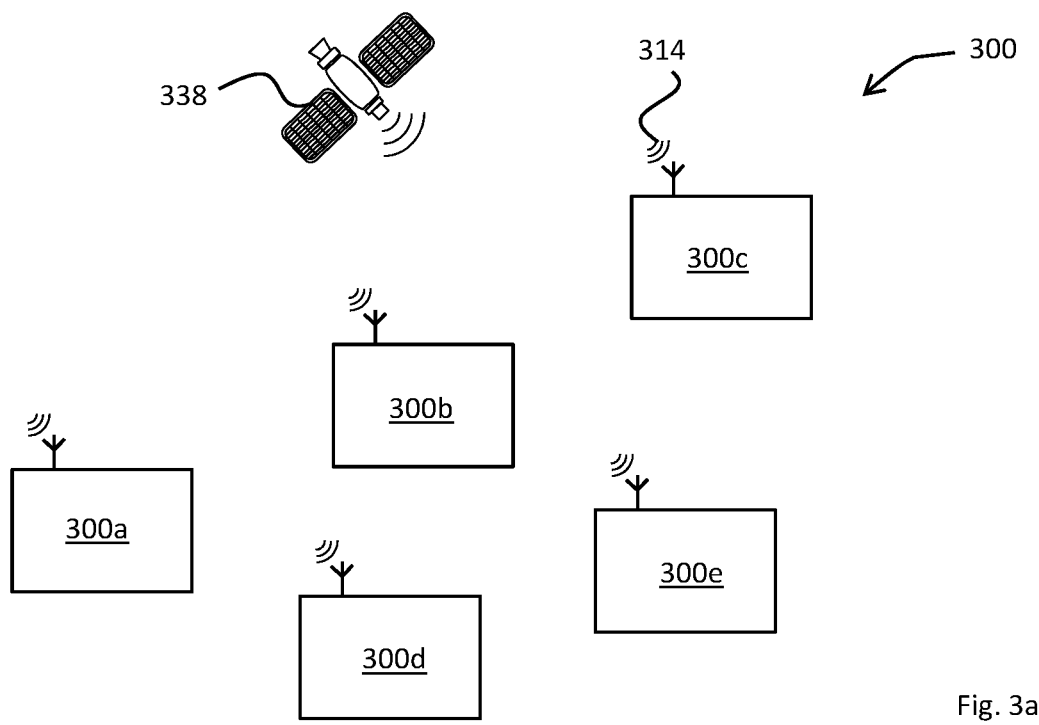
FIG. 3a shows a schematic representation of a network of signal generators.
Figure 3B:
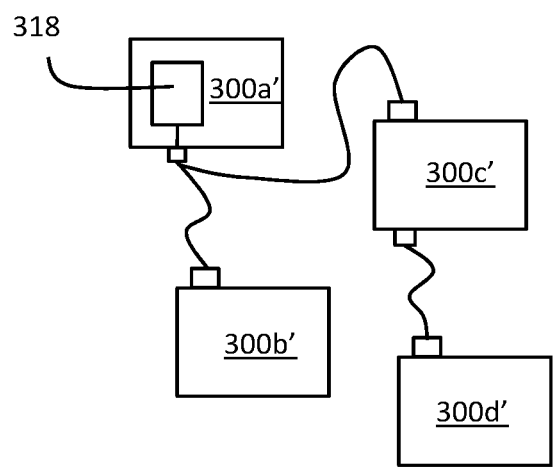
FIG. 3b shows a schematic representation of an alternative network of signal generators.

As noted above, the apparatus 200 and/or signal generator 212 may be one or a plurality of signal generators 212 which are arranged in a network and/or within range of each other. FIG. 3a shows a system 300 comprising a plurality of apparatuses 300a-e which each wirelessly receive a common synchronisation signal 314. The source of the synchronisation signal 314 may be any suitable for broadcasting the signal wirelessly such as a ground based antenna or an airborne entity, such as a satellite 338. FIG. 3b shows an alternative example in which the synchronisation signal is generated within a master unit 340 and distributed to other signal generators within the network of apparatuses 300a'-d'. The wired network may comprise one or more a radial distributions of apparatuses 300a'-d' with each radial distribution may include one (300b') or more (300c'-d') apparatuses. Hence, the apparatuses may relay the received signals from an upstream source to a downstream apparatus. The initial source of the synchronisation signal may be referred to as a master unit 338, with the subsequent signal generators being referred to as slaves. It will also be appreciated that the network of apparatuses may include a combination of wireless and wired connections for distributing the synchronisation signal.

Figure 4:
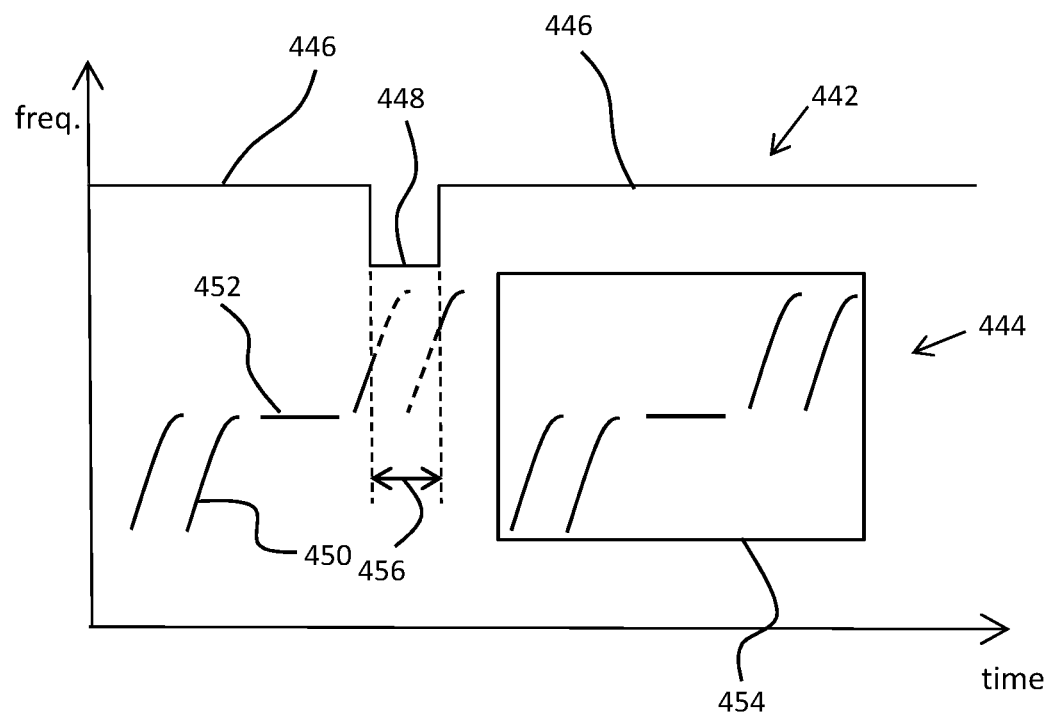
FIG. 4 shows a plurality of waveforms which may be generated by a signal generator which is partially transmitted and partially muted.

With reference to FIG. 2, FIG. 4 shows a schematic representation of a transmission status 442 of an apparatus 200 and a generated output signal/waveform 444 provided by the signal generator 212 for transmission by the antenna 220. The transmission status 442 may be characterised by one or more transmit periods 446 and one or more mute periods 448 in which the antenna 220 transmits a radio wave during the transmit period 446 and does not transmit during a mute period 448.

The signal generated 444 by the signal generator 212 may comprise a plurality of waveforms of varying frequency which are output in sequence from the signal generator 212. Thus, FIG. 4 shows a plot of frequency vs time including, by way of example only, a plurality of swept signals 450 which begin at a first frequency and sweep to a second frequency. The frequency sweep may take any from and may be linear or non-linear. Additionally or alternatively, the output waveform 444 may comprise one or more constant frequency periods 452 in which the frequency remains relatively constant for a predetermined duration. This may be referred to as a hop. The combination of the sweep and hop may be referred to as a sweep/hop waveform. There may be any number of sweeps and/or hops within a frame, and other types of waveform are possible. That is, the output waveforms 444 may comprise any waveforms as required for a particular application and will be application specific.

The output waveform 444 may be periodic, with each period considered to be a frame. Each frame may be repeated in series for the duration of an operating period of the apparatus or there may be a plurality of different frames within a period of operation. It will be appreciated that in some examples, a frame may comprise signals which differ from other adjacent frames in a series of frames. Thus, the period may be determined by discrete packets of output waveforms which are separated by mute periods.

An example frame 454 is denoted on the right hand side of plot bordered by a box. (It will be appreciated that the box does not form part of the signal). This frame 454 and the pattern of waveforms within it may be repeated in a series for a predetermined duration of operation. This example frame includes a pair of adjacent sweeps, each extending from a first frequency to a second frequency; a hop; and a second pair of adjacent sweeps extending from a third frequency to a fourth frequency.

As noted above, the transmission includes periods of transmit 446 and mute 448 in which the antenna 220 (or some other form of wireless or wired output connection) transmits and does not transmit the generated output, respectively.

The mute period 448 may relate to a disruption in the connection between an output 218 of the signal generator 212 and the output of the apparatus 200 of which the signal generator is part. Thus, in the example of a transmitter, the signal generator 212 may incorporate one or more switches which are operable to attenuate or isolate the signal generator output from the antenna 218 such that there is no appreciable transmission. Referring to FIG. 2, the switch may be provided by the power amplifier 224 which can be switched off or muted to prevent transmission of the signal to the antenna 220. The one or more switches may be controlled by one or more controllers which are internal to the apparatus, or external.

The mute period 448 generally overlays the signal generator output 218. As such, the signal generator 212 may generate an output 218 regardless of the transmitter status and presence of a mute period 446 which is determined separately and in accordance with the synchronisation signal 214. The output 218 may be continuous despite the transmission being muted, or may be reset or restarted from a particular point in the frame once a mute period has been instigated. The control of the transmission 442 may be separate to the control of the signal generator 212.

The transmission of the output may be muted for a mute duration 456. The mute period 448 may be timed in relation to the synchronisation signal 214. For example, the start of the mute period 448 may coincide with a rising or falling edge of the synchronisation signal 216 or may be offset from the rising 234 or falling 236 edge by a predetermined amount. As the synchronisation signal is shared with the other entities in a network it is possible for the mute period 448 to be temporally aligned with the mute periods of other apparatuses in the network of apparatuses such that they occur at the same time. The duration 456 of the mute period 448 may be any predetermined duration and, outside of a synchronisation period, the same for all of the members of the network. If the mute period 448 is offset from the synchronisation signal 314 by a predetermined amount, the predetermined amount of offset may be common to the other entities in the network to ensure a proper synchronisation across the network.

The preceding frame on the left hand side of FIG. 4 has substantially the same waveforms as the frame 454 on the right hand side, however the preceding frame has been overlaid by the mute period 448. Thus, the signal generator 212 generates a signal which, during a first phase, is provided to the output of signal generator 218 and sent to the antenna 220 for transmission. During a second phase, the output 218 of the signal generator is isolated from the antenna 220 and the transmission is muted. During a third phase, the antenna 220 is reconnected to the signal generator output 218 and the transmission of the waveform may recommence.

In the example of FIG. 4, the mute period 448 overlays the output 218 of the signal generator which is continuous. Hence, periods of the frame may be generated by the signal generator but do not get transmitted, as shown by the dashed lines which fall within the muted period 448. However, this may not be satisfactory where there is a requirement in which all of the generated waveform outputted by the signal generator 212 is transmitted. To help alleviate this, the output of the signal generator may be paused and/or restarted and/or rewound at the end of the mute period 448. In some examples, the waveform may be paused at and/or restarted from a particular point or frequency when the mute period 448 started.

Figure 5:
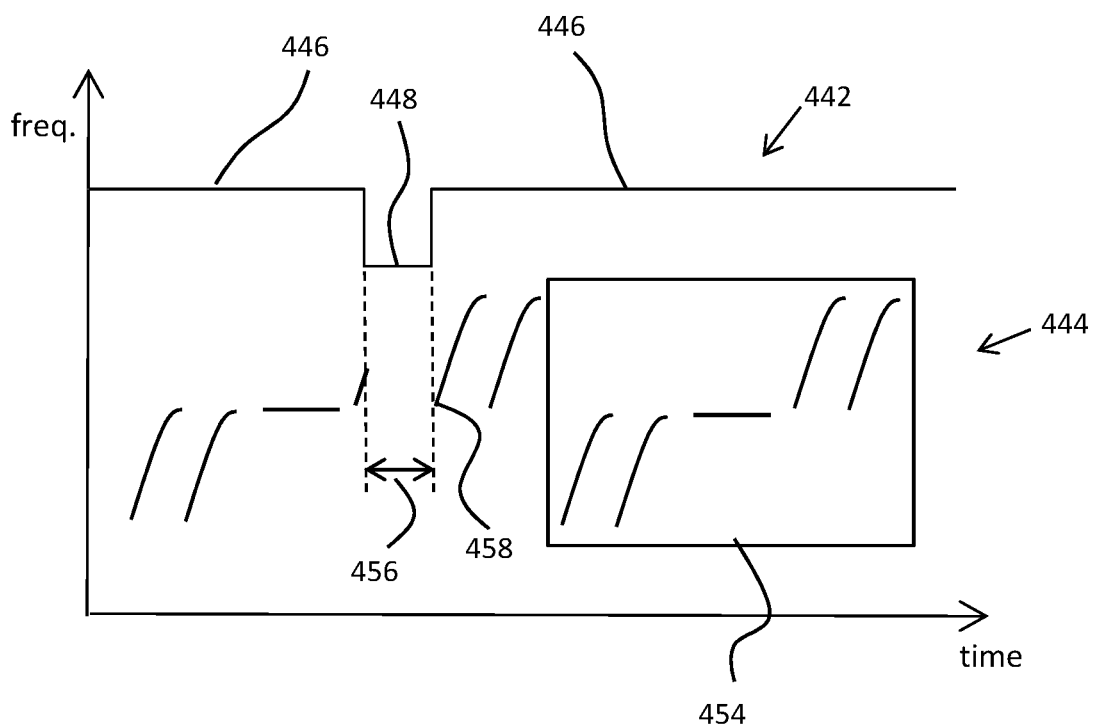
FIG. 5 shows a further example of a plurality of waveforms which is adapted for a muted period in an alternative manner to that of FIG. 4.

In the example of FIG. 5 corresponding features include the same reference numerals as those of FIG. 4. In FIG. 5, the frequency sweep commences at an initial or first frequency and increases to a second frequency. However, the mute period 448 occurs during this initial sweep such that an active signal, that is one currently being transmitted, is cut-off half way through the transmission. The transmission may then be reset/rewound so as to return to the start of the first frequency of the interrupted sweep as indicated by reference numeral 458.

To enable this, the signal generator 212 or the driving input 216 may receive information relating to the presence of a mute being carried out and determine the appropriate point at which to restart the output of the signal generator 212.

As noted above, the mute periods 448 may be synchronised with the synchronisation signal 214 so as to occur at the same time as the synchronisation signal 214 or offset by a predetermined amount. There may be a plurality of mute periods 448 per synchronisation period. There may be a plurality of mute periods per frame. There may be a plurality of frames per synchronisation period.

Figure 6:
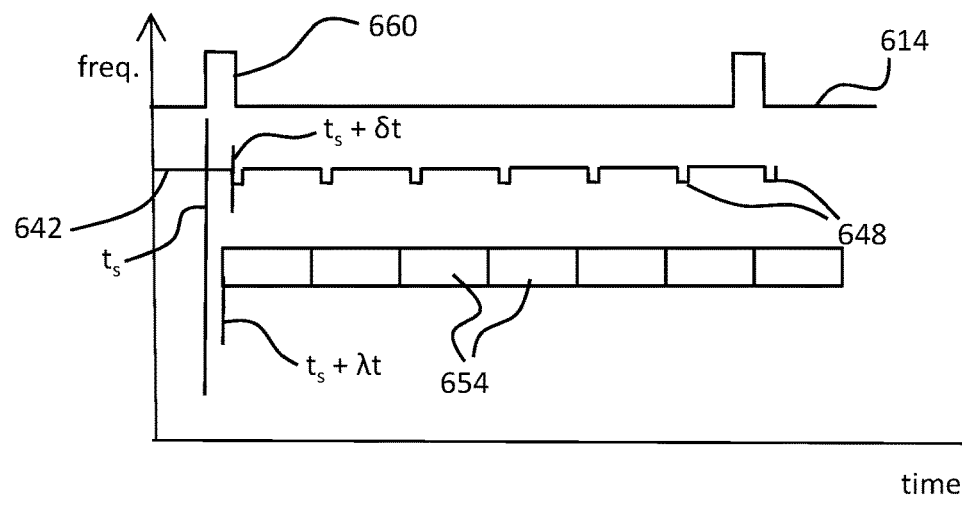
FIG. 6 shows a schematic plot of a signal generator output in relation to a series of mute periods and a synchronisation signal.

FIG. 6 shows a synchronisation signal 614, a transmit status having a plurality of mute periods 648 and a plurality of frames 654. The synchronisation signal 614 includes a series of pulses 660 which may generate and/or received for a required duration, as determined by the operation of the apparatus(es). As described above, the synchronisation pulses 660 may be one pulse per second providing a synchronisation period of 1 second. The mute periods 648 are distributed in time in relation to the synchronisation pulse 660. There may be N mute periods per synchronisation period, where N is a whole integer. The first mute period is provided at $t_s+\delta t$ in which $t_s$ is the synchronisation time which may be determined by the rising edge (or falling edge) of a pulse of the synchronisation signal, and $\delta t$ is a predetermined time delay after $t_s$ in which $\delta$ is between zero and the period of synchronisation signal. There may be M frames 654 per synchronisation period wherein M is a whole integer. M and N may be the same or N may be a factor of M such that there is a plurality of mutes per frame period.

The frame periods 654 may be aligned with synchronisation pulses 660 in a similar manner to the mute periods 648. Thus, a first frame may be provided at time $t_s+\lambda t$, wherein $t_s$ is the synchronisation time which may be determined by the rising edge (or falling edge) of a pulse of the synchronisation signal 614, and $\lambda t$ is a predetermined time delay after $t_s$ in which $\lambda$ is between zero and the period of synchronisation signal (or length of the frame where there is a sequence of frames extending between the synchronisation pulses 660).

Importantly, in the above described example, the timing of the output signal of the signal generator is determined arbitrarily in relation to the mute period 648 and synchronisation signal 614. Hence, although $\lambda$ may be any value, the value is not predetermined in relation to the synchronisation signal or mute periods. $\delta$ and $\lambda$ may or may not be different to one another such that the mute period may or may not fall within a central period of a frame 654.

An alternative to the above described method is to adaptively synchronise the output signal of the signal generator with that of the synchronisation signal and/or mute periods. Thus, in some examples of the present disclosure, the timing of the one or more periods of the output signal of the signal generator may be adjusted so as to be synchronised with the synchronisation signal and/or mute periods. The signal generator may generate an output signal having an output signal synchronisation point which may be offset with respect to a synchronisation point of the synchronisation signal. The timing of the output signal, or one or more periods thereof, may be adjusted to reduce the magnitude of the offset so as to reduce the separation of the respective synchronisation points of the output signal and the synchronisation signal. The offset may be reduced to a predetermined amount which, when achieved, may be considered to provide synchronisation with the synchronisation signal. The adjustment of the offset may be iterative and may be carried out over a plurality of frames, mute periods or synchronisation periods. The adjustment may include advancing or retarding downstream frames by extending or contracting adjustment periods within a frame. The adjustment periods may be dummy periods and/or active periods of the frame, as discussed in more detail below.

An advantage of the synchronising the output signal and the synchronisation signal and/or mute periods means that the output signal can be produced constantly and without having signal periods transmitted or interrupted, as is the case with the overlaid examples previously described in relation to FIGS. 4 and 5.

In one example, the adaptively synchronising the output signal with the synchronisation signal and/or mute periods is achieved using a driving input signal with one or more active periods and one or more dummy periods. The one or more active periods provide information relating to an active role of the apparatus, such as a signal provided for jamming of other device in the vicinity. The one or more dummy periods may provide a placeholder which can be aligned with a mute period in which no output is transmitted. Alternatively, the one or more dummy periods may be populated with a predetermined dummy signal which is recognisable to each of the other apparatuses in the network.

Accordingly, the output signal may include a plurality of frames. Each frame may comprise one or more active periods and one or more dummy periods. The active periods may comprise signal waveforms which are transmitted from the apparatus for a predetermined active purpose. The active periods may comprise jamming signal waveforms. The dummy periods may comprise one or more of: no output signal, a null output signal which is not for the purpose of jamming; a communication signal for communicating with the other apparatuses within the network; or a jamming signal which is known to the other apparatuses within the network. The dummy period may be common to all of the apparatuses in the network in as much as the content of the dummy periods of the apparatuses in the network is the same. Thus, a frame may include an active period which is unique to a particular apparatus or sub-group of apparatuses, and a dummy period which is common to all apparatuses.

The apparatus, signal generator and networks described in FIGS. 1 to 3b may be suitable for implementing the adaptive synchronisation method and are not described further here. The apparatus of FIG. 2 and features thereof will be referred to below for convenience and to improve the clarity of the disclosure.

Figure 7:
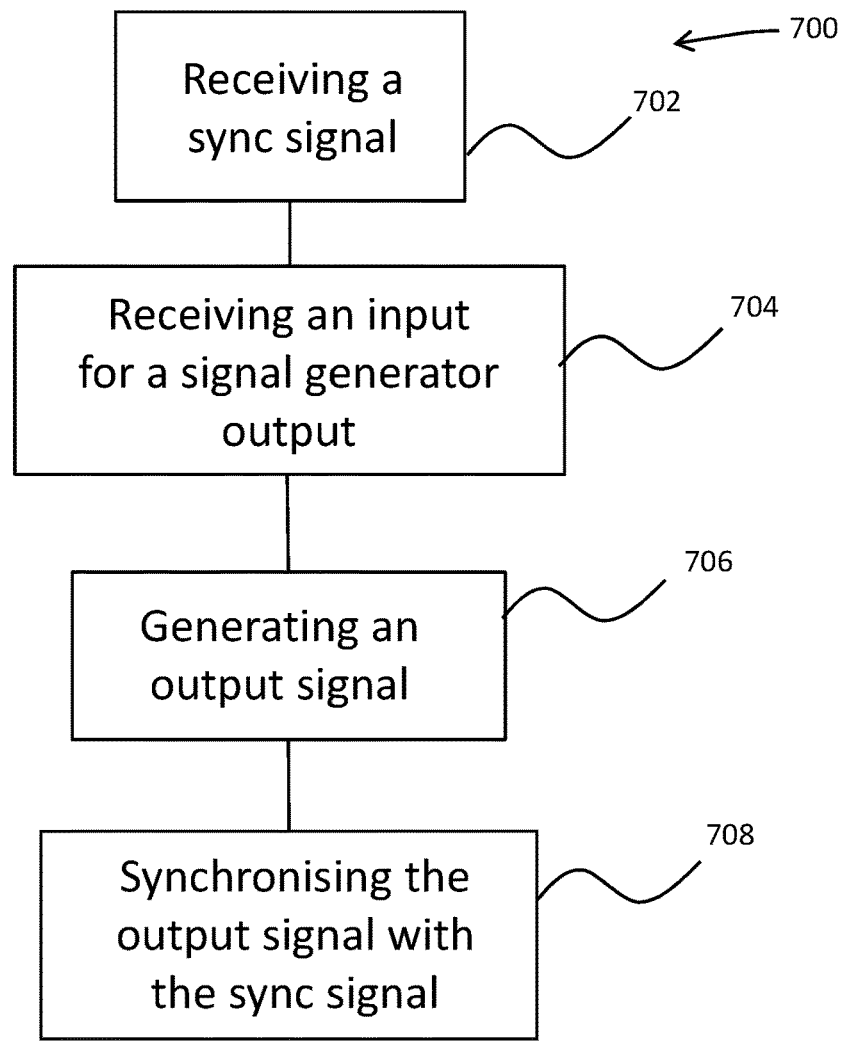
FIG. 7 shows a flow diagram of a synchronisation method according to the present disclosure.

FIG. 7 shows a flow diagram 700 of an alternative method according to an example of the present disclosure. In FIG. 7, the apparatus 200 may receive a synchronisation signal 702; receive an input 704 from which a signal generator can generate an output signal 706; and, synchronise the output signal with the synchronisation signal and/or mute periods 708.

The synchronisation signal may generally be similar to those previously described and will not be described further here.

The input signal may be of a similar form to those described above in that it may be used to provide a driving input for a waveform generator which may be of any suitable type known in the art. The input driver may be provide data or signals which, when converted by the signal generator, provide an output having active periods and one or more dummy periods, as described above. The adjustment of one of these periods may be achieved by the signal generator using feedback which is indicative of a synchronisation error. However, in some examples, the feedback relating to the synchronisation error may be received by a driving input generator which is upstream of the signal generator. The driving input generator may adapt the driving input data to adjust the synchronisation of the signal generator. In one example, the FPGA may comprise a control loop which adjusts the dummy period in accordance with the difference and any restrictions such as a maximum adjustment and a minimum adjustment, as described herein.

The output signal 818 of the signal generator 212 will be further described in relation to FIGS. 8a to 8f. FIG. 8a shows a frame 844 having one or more active period $A_{F1}$ and one or more dummy period $D_{F1}$. Each frame shown in FIG. 8a includes only one active period and one dummy period but there may be any number of active and dummy periods in any particular frame 844. The frame 844 may be repeated downstream to provide a sequence of identical frames, each comprising an active period $A_{F2\text{-}N}$ and a dummy period $D_{F2\text{-}N}$, where N is a number equal to the number of frames.

The frame 844 may be generated by the signal generator 212 at an arbitrary time determined by an initialisation of the signal generator 212 or upon receipt of the driving input signal 814, for example. The initial output of the signal generator 212 shown on the left hand side of FIG. 8a may not be synchronised with a synchronisation signal 216 in any predetermined way. As with the previously described examples, the synchronisation signal 216 may include a synchronisation point Sync1 which may be provided by one or more rising or falling edges of a pulses, for example. As the timing output of the signal generator 212 is arbitrary in relation to the synchronisation signal, the position of the synchronisation point Sync1 may be located anywhere along the length of the frame 844.

FIG. 8b shows the same frame 844 as that of FIG. 8a with the box removed for the sake of clarity and with an indication of the offset between the sync1 synchronisation point and a second synchronisation point sync1' of the output signal. Point sync1' may be aligned with any suitable feature of the output signal. In the example shown in FIG. 8b, the feature is the leading edge of a dummy period $D_{F1}$.

FIG. 8c shows the determination of a difference $\delta_{err}$ between the first synchronisation point Sync1 of the synchronisation signal and a synchronisation point Sync1' of the output signal. This difference $\delta_{err}$ may be referred to as a synchronisation offset or synchronisation error. The synchronisation offset may be the amount which needs to be subtracted from or added to the timing of a subsequent frame or period of a frame in the output signal 818. Hence, one or more of a subsequent active period or a subsequent dummy period may be modified by $\delta_{err}$ to retard or advance the downstream output signal 818 with a to reducing $\delta_{err}$ and providing synchronicity with Sync1. The determination of the synchronisation offset may be achieved by monitoring the relative times of the synchronisation point Sync1' of output of the signal generator and comparing it to the synchronisation point Sync1 of the synchronisation signal 216.

FIG. 8*d* shows the subtraction of the synchronisation offset $\delta_{err}$ from a subsequent adjustment period which is downstream of synchronisation point Sync1. The adjustment period may be a downstream dummy period $D_{FN-1}$. The subtraction may be achieved by reducing (or increasing) the duration of a downstream adjustment period $D_{Fn-1}$ in the driving input which is provided to the waveform generator 230 within the signal generator 212. The downstream location of the adjustment period may be conveniently chosen according to the time required to determine the error and update the driving input signal. As noted above, the driving input may be the input 216 received by the signal generator 212, or that produced by the driving circuit 232. The driving input may include a signal or data which includes one or more periods which correspond to the active periods produced by the signal generator, and one or more periods which correspond to the dummy periods.

The adjusted dummy period $D_{FN-1}-\delta_{err}$ is shown in FIG. 8*e* in which there is a noticeably shorter dummy period in comparison to the other dummy period $D_{FN-2}$.

FIG. 8*f* shows a subsequent synchronisation point which is downstream of the adjusted dummy period $D_{FN-1}$ in which the synchronisation points of the synchronisation signal Sync2 and the output signal Sync2' coincide with one another. Thus, the offset between the two synchronisation points is zero or within an acceptable range. Thereafter, the output signal is considered to be synchronised. The location of the second synchronisation points may be downstream repetitions of the first synchronisation points. Hence, the second synchronisation point of the synchronisation signal may be provided by a rising and falling edge of the synchronisation signal 216, and the synchronisation point of the output signal may be provided by the boundary between an active period and a dummy period, or some other suitable marker.

The output 218 of the signal generator 212 may be transmitted or muted whilst the synchronisation process is being carried out. Therefore, the signal generator 212 may generate a first output during a synchronisation period and a second output during a transmission period. The synchronisation period may be of any duration required for achieving the necessary amount of adjustment and synchronisation. Alternatively, the synchronisation period may be transmitted, if appropriate.

Figures 9A, 9B, 9C:
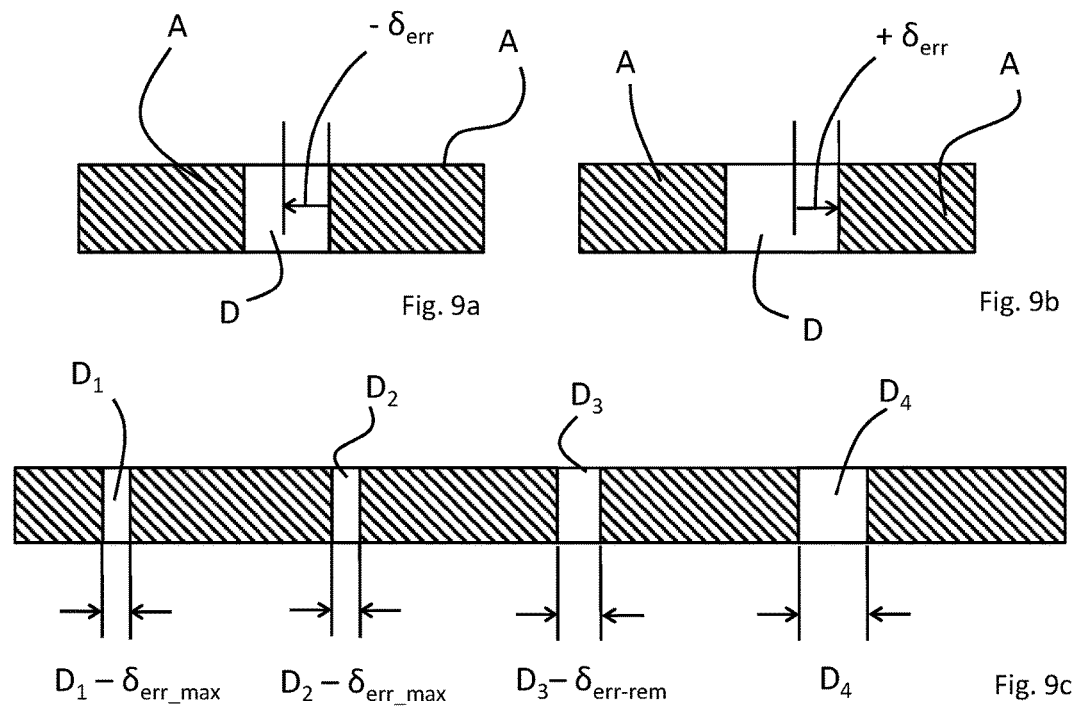
FIGS. 9a-9c show alternative ways of modifying an adjustment period as part of a synchronisation method.

The offset $\delta_{err}$ between the synchronisation signal 216 and the output signal 218 may be subtracted or added to the next adjustment period. FIGS. 9*a* and 9*b* each show a frame having a dummy period D which is surrounded on either side by an active period A. In each case, the dummy period D is taken to be an adjustment period and as such has its duration altered to reduce the synchronisation error $\delta_{err}$. The adjustment shown in FIG. 9*a* is a subtraction in which the offset error $\delta_{err}$, or a period thereof is subtracted from the adjustment period. This causes an associated retardation of the output signal and subsequent synchronisation points relative to the synchronisation signal as described in relation to FIGS. 8*a-f*. FIG. 9*b* shows an addition in which the offset error $\delta_{err}$ is added to the adjustment period to extending the duration of the frame and advancing subsequent synchronisation points relative to the synchronisation signal 216. The of whether to use a subtractive adjustment or an additive adjustment will depend on whether the synchronisation point of the output signal leads or lags the synchronisation point of the synchronisation signal and needs to be retarded or advanced.

Although the above examples, describe the adjustment period as being that of a dummy period D, it may be possible for an active period A to be adjusted in place of or in addition to a dummy period.

The adjustment of the output signal 218 may be achieved by altering one more periods. Thus, for small adjustments, a single adjustment period may be altered to provide synchronisation. In some examples, the extent of correction required is greater than a predetermined threshold for adjustment. In such a case, the adjustment may be distributed across a plurality of adjustment periods. The adjustment periods may be provided sequentially. For example, the adjustment periods may be provided by a sequence of dummy (or active) periods in a given frame or sequence of frames. The distribution of adjustments may include one or more major adjustment and one or more minor adjustment. The one or more major adjustment may correspond to a maximum adjustment which can be tolerated by the output signal. Thus, there may be an upper threshold to which the dummy period can be extended or reduced without it change in length being detrimental to the content of the dummy period, or possibly the surrounding active periods. Additionally, there may be a minimum adjustment which can be tolerated by an adjustment portion.

FIG. 9*c* shows a partial frame having a plurality of dummy periods $D_1$-$D_4$ and associated intervening active periods. The $\delta_{err}$ in this example exceeds a maximum permissible error which can be subtracted from any one dummy period. Hence, the offset error $\delta_{err}$ is distributed across a plurality of dummy periods. The first dummy period $D_1$ is equal to the unaltered dummy period duration with a maximum offset error $\delta_{err\_max}$ subtracted to provide an adjusted dummy period. The second dummy period $D_2$ has been similarly modified with the dummy period having the $\delta_{err\_max}$ subtracted. The third dummy period $D_3$ has been adjusted to account for the remained of the measured offset $\delta_{err\_rem}$. The final dummy period shown in FIG. 9*c* $D_4$ is unaltered.

The maximum offset may be determined by the effect it has on the other periods or frames which are adjacent to the adjustment period. For example, subtracting or adding too much from a dummy period may be adjusted to meet a requirement of the system and to avoid deleterious effects to the other portions of the signal. The amount of adjustment may range from a few microseconds to a few milliseconds. The adjustment may be determined on the basis of what is being adjusted. Thus, a dummy period with no signal may be adjusted more freely than an active dummy period which includes one or more signals which needs to be transmitted.

The adjustment may be carried out continually for the duration of the operation. Thus, the offset $\delta_{err}$ between the subsequent synchronisation points may be continually (or regularly) monitored so as to account of any small errors or drift in either of the synchronisation signal or generator output. Hence, the error may be measured at each synchronisation point of the synchronisation signal, for example.

Figure 10:
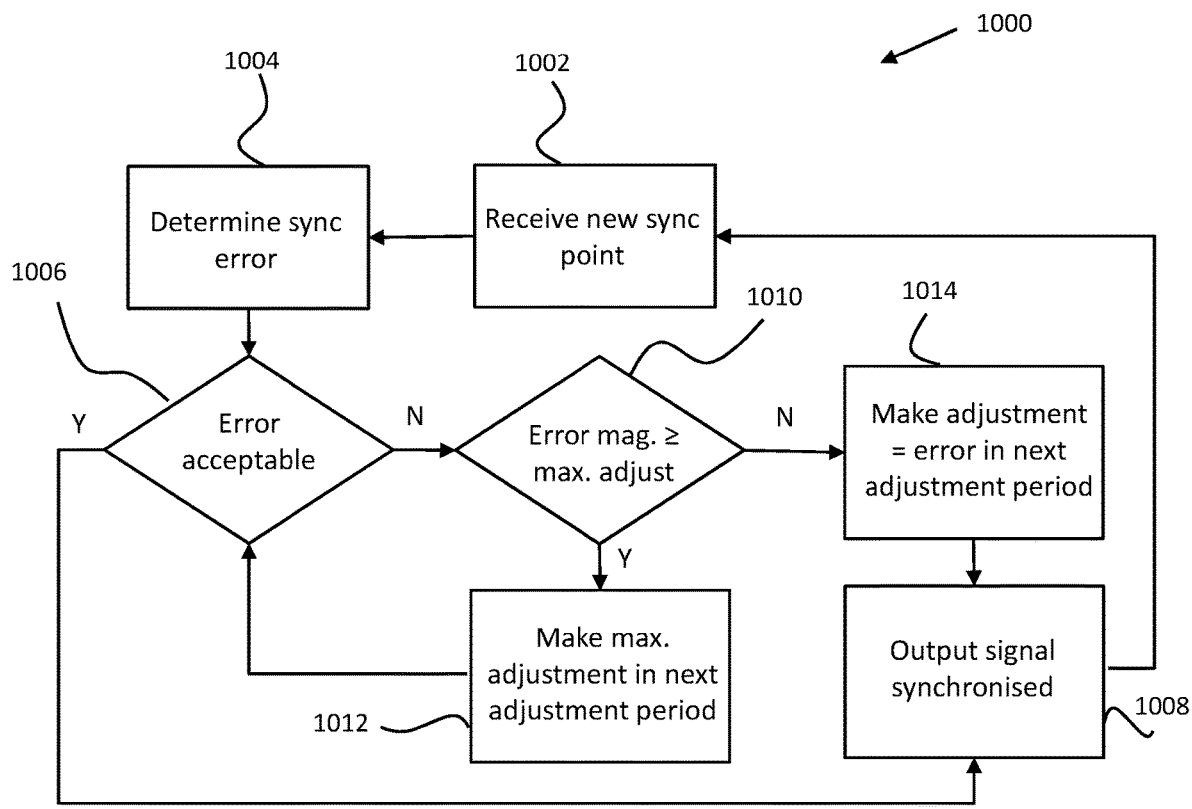
FIG. 10 shows a flow diagram of a further method of synchronising an output of a signal generator with a timing reference.

The method of synchronising the output of the signal generator and the synchronisation signal is shown in the flow diagram of FIG. 10. The synchronisation method 1000 may comprise a first step of receiving a first of new synchronisation point from the synchronisation signal and a corresponding synchronisation point from the output signal

1002. Next, the synchronisation error between the two synchronisation points may be determined 1004. This determination may be made, for example, by measuring the timing difference between the two synchronisation points. Once obtained, an assessment is made as to whether the determined error is within an acceptable limit 1006. The acceptable limit may be determined by the application and requirements and/or of the other units within the network.

If the error is acceptable the output signal and driving input signal may be determined to be synchronised and not adjusted so as to remain unchanged until the next synchronisation point, as provided by the next pulse in the synchronisation signal, for example. If the offset error is beyond an acceptable level or threshold value, the magnitude of the error is assessed to determine whether it is greater than or equal to a maximum error which can be adjusted for in a single adjustment period 1010. If the offset error is below the maximum, the full offset error may be adjusted for (either by addition or subtraction) in the next downstream adjustment period 1010. If the error is greater than the maximum permissible error, then the maximum amount may be adjusted for in the next available adjustment period 1212. The remainder of the offset error may be accounted for in subsequent adjustment periods either by subtracting further maximum permissible errors or the remainder. In the example shown in FIG. 10, the remaining error is assessed after every adjustment by returning to box 1006, however, this is not necessary and the adjusted error may summed using an accumulator or the like until the full error is confirmed as having been accounted for before further assessment or measurement of the error is made.

If the error is below the maximum permissible adjustment, the error is corrected in the next available adjustment period 1214 to provide the synchronised signal 1008.

Figure 11:
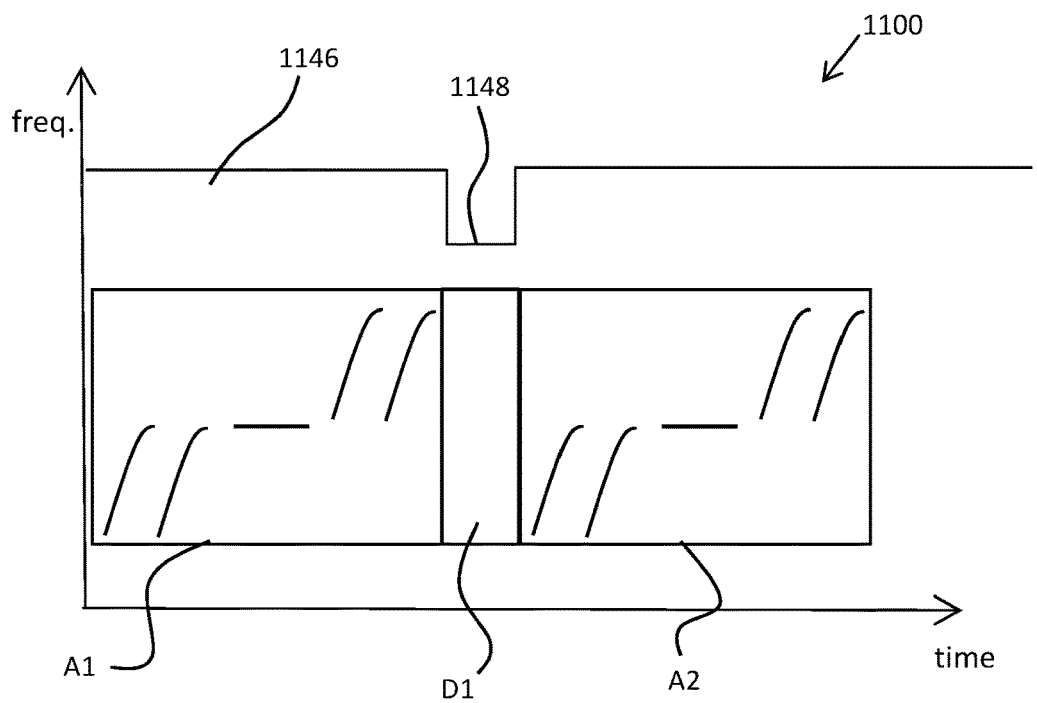
FIG. 11 shows a schematic representation of signal generator output comprises active periods and a dummy period.

With reference to FIG. 2, FIG. 11 shows a frame 1100 of an output signal of a signal generator having a plurality of active periods A1, A2 and at least one dummy period D1. The active periods A1, A2 may be the same and may include any desired waveform. The waveforms shown are similar to those described in connected with FIGS. 3*a* and 3*b* for ease of explanation and include frequency sweeps and hops.

The dummy period D1 segregates adjacent active periods A1, A2 and provides a placeholder for a section of the output which may be utilised in any desired manner. In the example of FIG. 11, following a synchronisation method, the dummy period D1 may be aligned with a mute period 1148 of the transmitted output. As the dummy period D1 does not comprise a waveform there is no transmission during this phase of the frame and there is no transmission or output from the antenna 220. Thus it will be appreciated that there is no need to provide a separate control for connecting and disconnecting the antenna 220 from the output of the signal generator as the output already incorporates the mute period 1148. Further, the signal generator 212 may provide an output to the antenna (or other output element) continuously without the need to monitor for mute periods or regenerate/restart sections of the generated output, as was the case in the example of FIG. 3*a*. Further still, the waveform shown in FIG. 11 allows the signal to be fully delivered without interruption or loss within a particular frame or period.

Providing a mute period 1148 in a transmission may be useful as it may allow the transmitting entities within the network to have a period for receiving signals which would otherwise be jammed. Thus, if the one or more jammers were required to listen for communications from other entities in the network or for signals from potential jamming targets, this would not be possible if the jamming signals were continuously outputted.

Figure 12:
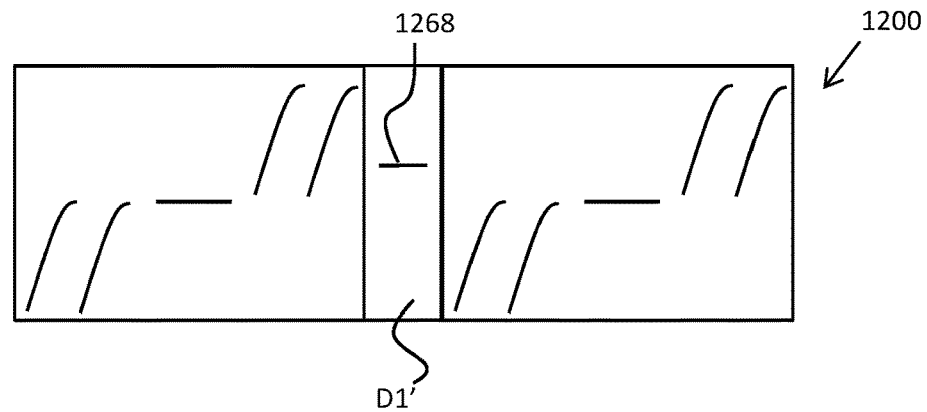
FIG. 12 shows a schematic representation of a signal generator output which comprises a signal within a dummy period.

In FIG. 12, the frame 1200 has a dummy period D1' which is shown as including a signal 1268 which may be outputted from the signal generator 212 and, optionally, transmitted in place of a mute period. The signal 1268 may be generic and may be an output which is shared with or at least known to the other entities in the network prior to transmission so that it may be recognised as a null output from the apparatus 200. This allows the entities in the network to continue to output useful jamming signals during an otherwise mute period and provide potentially useful jamming signals without interruption.

Figure 13:
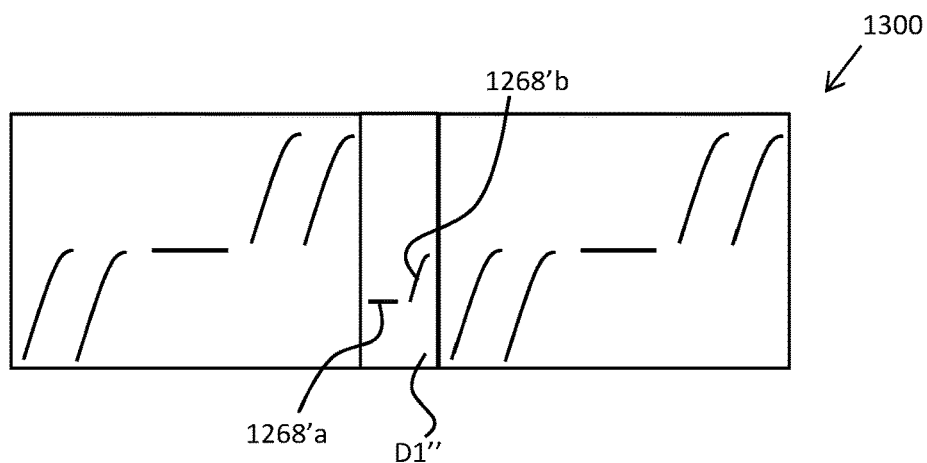
FIG. 13 shows a schematic representation of a signal generator output which comprises a complex signal within a dummy period.

FIG. 13 shows an alternative example of a frame 1300 in which the dummy period D1" includes a more complex output which may include a plurality of discrete waveforms 1268'*a,b*. Each of the waveforms 1268'*a,b* may be of a predetermined shape, duration and may have a predetermined purpose. For example, each of the waveforms 1268'*a,b* within a dummy period D1" may perform communication with another entity within the network or an entity which is external to the network. Additionally or alternatively, the dummy period signal may perform a jamming function. Thus in these examples, the dummy period D1" may form an active role in the frame or transmission. However, as noted above, the signals 1268'*a,b* within the dummy period are common to or at least known to the other entities in the network. Hence, in this example, a dummy period D1" may be considered to be any part of a frame in which the content is known to the other entities within the network or null. Null may comprise a non-transmission (i.e. a mute period) or a non-jamming signal.

Where a dummy period includes a signal for transmission as is the case in FIG. 13, the method shown in FIG. 10 may include a consideration of the signal and how much it can be adjusted. Thus, in some instances, there will be a limit to the amount a signal may be adjusted before the signal losses fidelity and is unable to fulfil a particular function for which it is designed. In this instance, it may be necessary to set the maximum permissible adjustment to that limit.

It will be understood that the invention is not limited to the examples and embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of producing an output jamming signal from a signal generator, comprising:
    determining a driving input to the signal generator, the driving input for driving the signal generator to provide a predetermined output signal,
    wherein the output signal includes at least one frame, the at least one frame comprising an active period and a dummy period and wherein the active period and dummy period are determined by the driving input; and
    wherein the dummy period (D) includes one or more dummy signals for transmission.

2. A method as claimed in claim 1, further comprising adjusting a duration of one or more of the active period and the dummy period to synchronise the output signal with a synchronisation signal.

3. A method as claimed in claim 2, further comprising selecting a synchronisation point in the output signal;

selecting a synchronisation point in the synchronisation signal; and, determining an offset error which relates to the difference between the two synchronisation points, wherein adjusting the duration of one or more active and dummy period reduces the offset error.

4. A method as claimed in claim 1, wherein the dummy period comprises a muted output in which no output signal is generated by the signal generator.

5. A method as claimed in claim 1, wherein the one or more dummy signals are received from or shared with at least one other signal generator apparatus and/or receiver.

6. A method as claimed in claim 1 further comprising a synchronisation period comprising transmission of a synchronisation signal, the synchronisation period taking place before the step of determining the driving input to the signal generator.

7. A method of producing an output jamming signal from a signal generator, comprising:
receiving a synchronisation signal;
obtaining an input signal for controlling the signal generator to generate an output signal comprising at least one frame wherein the at least one frame comprises at least one active period and at least one dummy period;
producing the output signal comprising a series of frames; and,
synchronising the output signal with the synchronisation signal by varying a duration of the at least one of the dummy period or active period, wherein the at least one dummy period (D) includes one or more dummy signals for transmission.

8. A method as claimed in claim 7, wherein the synchronisation signal is received from an external source.

9. A method as claimed in claim 7, wherein the synchronisation signal is used to synchronise the output signal with at least one other signal generator.

10. A method as claimed in claim 7, wherein varying the duration of the dummy period or active period comprises:
determining a first synchronisation point of a timing reference and obtaining a second synchronisation point of the output signal;
determining a difference between the first synchronisation point and the second synchronisation point; and,
reducing or increasing the duration of the dummy period or active period in accordance with the difference.

11. A method as claimed in claim 10, wherein the difference between the first and second synchronisation points is distributed amongst a plurality of dummy periods or active periods.

12. A method as claimed in claim 7, wherein the duration of a plurality of the dummy periods or active periods are varied.

13. A method as claimed in claim 7, wherein the plurality of dummy periods are located in two or more frames.

14. A method as claimed in claim 7, wherein the synchronisation between the output signal and the synchronisation signal continues for the duration of the output signal being outputted from the signal generator.

15. An apparatus for producing an output signal comprising:
a signal generator configured to provide a predetermined output jamming signal including at least one frame, the at least one frame comprising an active period and a dummy period and wherein the active period and dummy period are determined by a driving input, wherein the dummy period includes one or more dummy signals for transmission;
an input for receiving the driving input for driving the signal generator so as to produce the predetermined output signal; and,
a synchronisation signal input for receiving a synchronised signal.

* * * * *

UNITED STATES PATENT AND TRADEMARK OFFICE
CERTIFICATE OF CORRECTION

PATENT NO. : 11,502,772 B2
APPLICATION NO. : 16/934212
DATED : November 15, 2022
INVENTOR(S) : Richard Harrison and Paul Hill It is certified that error appears in the above-identified patent and that said Letters Patent is hereby corrected as shown below:

In the Specification

Column 13, Line 1, change "with a to" to "with a view to"

Column 14, Line 1, change "of whether" to "choice of whether"

Signed and Sealed this
Fifth Day of September, 2023

*Katherine Kelly Vidal*
Katherine Kelly Vidal
*Director of the United States Patent and Trademark Office*